United States Patent
Levenberg (10) Patent No.: US 7,840,812 B1
(45) Date of Patent: Nov. 23, 2010

(54) AUTHENTICATION OF DIGITAL CERTIFICATES USED BY PORTABLE COMPUTING DEVICES

(75) Inventor: Richard Levenberg, Lafayette, CA (US)

(73) Assignee: Access Systems Americas, Inc., Sunnyvale, CA (US)

( * ) Notice: Subject to any disclaimer, the term of this patent is extended or adjusted under 35 U.S.C. 154(b) by 856 days.

(21) Appl. No.: 10/155,775

(22) Filed: May 24, 2002

(51) Int. Cl.
*H04L 9/32* (2006.01)
(52) U.S. Cl. .................. 713/176; 713/150; 713/151; 713/156
(58) Field of Classification Search .............. 726/2, 726/22
See application file for complete search history.

(56) References Cited

U.S. PATENT DOCUMENTS 5,666,416 A * 9/1997 Micali .................. 713/158

2005/0148323 A1 * 7/2005 Little et al. .............. 455/414.1

* cited by examiner

*Primary Examiner*—Pramila Parthasarathy
(74) *Attorney, Agent, or Firm*—Berry & Associates P.C.

(57) ABSTRACT

A synchronization device checks the revocation status of a digital certificate used by a portable computing device, such as a personal digital assistant or mobile phone. The synchronization device typically sends the revocation status to the portable device during a periodic synchronization operation. Revocation status checking can occur using minimal processing, memory or network access resources of the portable device. In some embodiments, the synchronization device is a desktop personal computer, or a server within a mobile communication network. In other embodiments, the portable device uses a certificate and sends the certificate to the synchronization device during a subsequent synchronization operation. In yet other embodiments, the synchronization device checks the status of a certificate, generates a summary for the certificate and transmits the summary to the portable device prior to its use of the certificate. In yet other embodiments, the synchronization device manages certificates for one or more portable devices.

15 Claims, 6 Drawing Sheets

SUMMARY OF DIGITAL CERTIFICATE:
- IDENTIFIER OF CERTIFICATE (E.G. CRYPTOGRAPHIC HASH OF CERTIFICATE)
- OWNER'S ADDRESS(ES)
- OWNER'S PUBLIC KEY
- CERTIFICATE VALID DATES
- WHEN CERTIFICATE'S VALIDITY WAS LAST CHECKED

420

DIGITAL CERTIFICATE:

OWNER'S INFORMATION:
- NAME
- ADDRESS(ES)
- PUBLIC KEY
- BUSINESS OR CONSUMER PROFILE
- PHOTO/FINGERPRINT OF AUTHORIZED USERS

412

CERTIFICATE INFORMATION:
- TYPE
- NUMBER
- VALID DATES
- ISSUER

414

DIGITAL SIGNATURE:
- CRYPTOGRAPHIC HASH OF CERTIFICATE

AUTHENTICATION OF DIGITAL CERTIFICATES USED BY PORTABLE COMPUTING DEVICES

TECHNICAL FIELD

Embodiments of the invention relate to the field of portable electronic devices, e.g., portable computing devices including but not limited to personal digital assistants or mobile phones, etc. Also, embodiments of the invention relate to the field of digital certificates.

BACKGROUND ART

Research and technology have provided society with a wide variety of electronic devices. Some modern electronic devices are powerful, and can be very beneficial to those who use them. For example, portable computing devices such as personal digital assistants (PDAs) are in widespread use. Their applications include but are not limited to storing addresses and phone numbers of contacts, tracking expenses and mileage, and keeping track of appointments and schedules, etc.

Also, use of cellular and other mobile phones to perform computing functions is increasing dramatically. Such computing tasks include but are not limited to: sending and receiving messages like a pager, sending and receiving electronic mail (e-mail) like a personal computer (PC), and even accessing web sites on the Internet like a PC.

A problem arises when a user of a portable computing device needs to know with certainty the true identity of the person or device on the other end of the conversation. Another problem is when a user needs to ensure that information sent out remains secure, that is that sensitive information is not available to an unintended recipient. These problems are related. For instance, suppose one can prevent unintended listeners from obtaining information they send out, but they do not know for sure to whom they are talking. In that case, the one could be mistaken about the identity of their intended recipient, or they could be fooled by a deliberate imposter.

Digital certificates are a known approach to these problems. A digital certificate is generally considered to be an electronic document that contains information about the owner of the certificate and that is issued by a trusted third party, called a certificate authority. When properly implemented and used, digital certificates can be an effective approach to verifying the identity of some person or entity with whom you interact with only electronically. However, proper use of digital certificates present substantial challenges, particularly when used on devices with limited resources such as portable computing devices.

Digital certificates are often used in conjunction with an encryption technique known as public key encryption. Digital certificates include the public key of the owner of the certificate. Sensitive information can be encrypted by means of someone's public key, and then sent to that person without the information being readable by anyone else. Encryption alone can provide privacy, but it cannot provide authentication to protect against accidental mistaken identity or deliberate fraud.

Electronic transactions occurring today between two businesses may use digital certificates for security and privacy. As part of the transaction, one party may check with a specified Certificate Authority to determine that the other party's certificate has not been revoked. This is analogous to checking with the state driver's license agency to verify that a particular driver's license has not been revoked or reported lost. As another part of the transaction, one party will then use the public key within the now verified digital certificate to encrypt any sensitive information prior to sending it to the other party. After encryption, the information may be sent as a file, an e-mail or over a network connection.

If these steps are performed before any sensitive information is sent, then there is a very high degree of likelihood that the parties involved are genuine, not an impostor. There is also a very high degree of likelihood that even if intercepted by someone other than the parties involved, that person will not be able to decrypt the sensitive information.

While this procedure may appear to be a burden, a typical consumer or business user need not know that digital certificates even exist. Once a secure system is set up, digital certificates and public key encryption can be used without user involvement unless a potential security problem is detected. For example, the above procedure can occur without the involvement of the party who just wants to perform a secure transaction.

Many web browsers that are popular today make at least some use of digital certificates and public key encryption, often without their users being aware that these activities are occurring on their behalf. Additionally, many schemes for on line distribution of software, software updates or other downloaded information use digital certificates. Used properly, digital certificates can authenticate that information obtained on line comes from a trusted source.

It is important to check the revocation status of every digital certificate used. A digital certificate may need to be invalidated after it is issued for any of a number of reasons. A relatively common one is that the information in the certificate has changed. A revocation check on such a certificate might return a status of "updated" along with the updated certificate.

However, checking the revocation status of a certificate may be problematic. Many currently popular web browsers make at least some use of digital certificates, but some of these skip revocation checking even when the browser is run on machines with high speed network access that has little or no cost for each use of the network.

A small device with limited processing power and limited networking bandwidth can do almost everything one would usually do with a certificate except check for the certificate's revocation status. Revocation checking entails checking LDAP directories and large Certificate Revocation lists and can be a very lengthy operation with a lot of latency for slow networks. Given the high latency on most small devices (e.g., PDAs, cell phones, etc.), or the high cost of low latency on small devices, it is problematic to perform revocation checking on small devices.

A portable computing device typically has very limited resources, including limited speed of its processor, a limited amount of memory, limited battery power and limited access to computer networks—network access that is slow, expensive, only available intermittently, or all three. It may be impractical for a portable device to perform the revocation check step due to intermittent network access or the delays incurred in checking with the certificate authority, or the network usage fees for sending and receiving revocation check messages. Revocation checking may only be cost effective for large transactions, those with potentially large consequences if compromised, or situations where something seems amiss or suspicious.

SUMMARY OF THE INVENTION

Accordingly, there is a need for checking the revocation status of a digital certificate used on a portable computing device while consuming little of the resources of that device.

A portable computing device holds a summary of a digital certificate. A synchronization device checks the revocation status of the certificate by accessing a certification server. A communication link couples the synchronization device and the certification server. A synchronization link active during a series of synchronization operations couples the portable computing device and the synchronization device. The synchronization device sends the revocation status to the portable computing device during one of the synchronization operations.

In various embodiments of the invention, the portable computing device may be, but is not limited to: a personal digital assistant (PDA), a mobile phone, an electronic mail device or a portable personal computer (PC). In various embodiments of the invention, the synchronization device may be, but is not limited to: a personal computer, a desktop personal computer, a local server, a remote server or a server that is part of a mobile communication network. In some embodiments of the invention, the certification server is operated by the issuer of the digital certificate.

In various embodiments of the invention, the synchronization link may be but is not limited to: a cradle coupled to the synchronization device, a wireless communications link, a local area network, a modem, a modem accessing the public switched telephone network, a private intranet and the Internet. In various embodiments of the invention, the communication link may be but is not limited to: a wide area network, a modem, a modem accessing the public switched telephone network or the Internet.

In various embodiments of the invention, the portable computing device may use the digital certificate for operations including but not limited to: authenticating a business for electronic commerce, authenticating a web site, authenticating a consumer for electronic commerce, or authenticating an e-mail address.

In various embodiments of the invention, the summary of the digital certificate may contain information that includes but is not limited to: an identifier corresponding to the digital certificate, a cryptographic fingerprint corresponding to the digital certificate, an electronic mail address corresponding to the digital certificate, a web site corresponding to the digital certificate, an Internet protocol (IP) address corresponding to the digital certificate, a public key corresponding to the digital certificate, an expiration date corresponding to the digital certificate, validity information corresponding to the digital certificate, or a copy of the digital certificate. In some embodiments of the invention, the revocation status of the digital certificate may be but is not limited to: valid, updated, expired or revoked.

In some embodiments of the invention, the portable computing device initially accesses a digital certificate. During a subsequent synchronization operation, the portable computing device may send the certificate to the synchronization device and, in response thereto, the synchronization device may return the revocation status. In other embodiments of the invention, the synchronization device, prior to the portable computing device's use of a digital certificate, checks the revocation status of that certificate, generates a summary of it and transmits the summary to the portable computing device.

In yet other embodiments of the invention, the synchronization device manages a set of digital certificates. Such management may include, but is not limited to: adding a certificate to the set being managed, generating a summary for a certificate, invalidating a certificate, removing a certificate from the set being managed, checking the revocation status of a certificate, automatically checking the revocation status of the certificates on a periodic basis, updating the summary of a certificate when it is found to have been updated, sending a summary of a certificate to the portable computing device, selecting which of the certificates have summaries sent to the portable computing device, or managing certificates for a plurality of portable computing devices.

The invention may be embodied as a system, a hardware module, a software module, a method, or a media that provides instructions for a programmable device.

BRIEF DESCRIPTION OF THE DRAWINGS

The above mentioned and other aspects, features and benefits of the invention will be apparent to those skilled in the art after review of the following description and drawings, in which.

DETAILED DESCRIPTION OF THE INVENTION

The description, discussion and figures herein illustrate technologies related to the invention, show examples of the invention and give examples of using the invention. Known methods, procedures, systems, circuits or components may be discussed without giving details, so as to avoid obscuring the principles of the invention. On the other hand, numerous details of specific examples of the invention may be described, even though such details may not apply to other embodiments of the invention. Details are included and omitted so as to aid in understanding the invention.

The invention is not to be understood as being limited to or defined by what is discussed herein; rather, the invention may be practiced without the specific details described herein. One skilled in the art will realize that numerous modifications, variations, selections among alternatives, changes in form, and improvements can be made without departing from the principles, spirit or legal scope of the invention.

Some descriptions herein use abstract or general terms including but not limited to module, symbol, number, bit, procedure, step, and block. Those skilled in the art use such terms as a convenient nomenclature for components, data or operations within a computer, digital device or electromechanical system. Such components, data and operations are represented by physical properties of actual objects including but not limited to electronic voltage, magnetic field and optical reflectivity. Similarly, perceptive or mental terms including but not limited to detect, sense, recall, present, compare, control, process, manipulate, analyze, and determine may also refer to such components, data or operations or to manipulations of physical properties.

Figure 1:
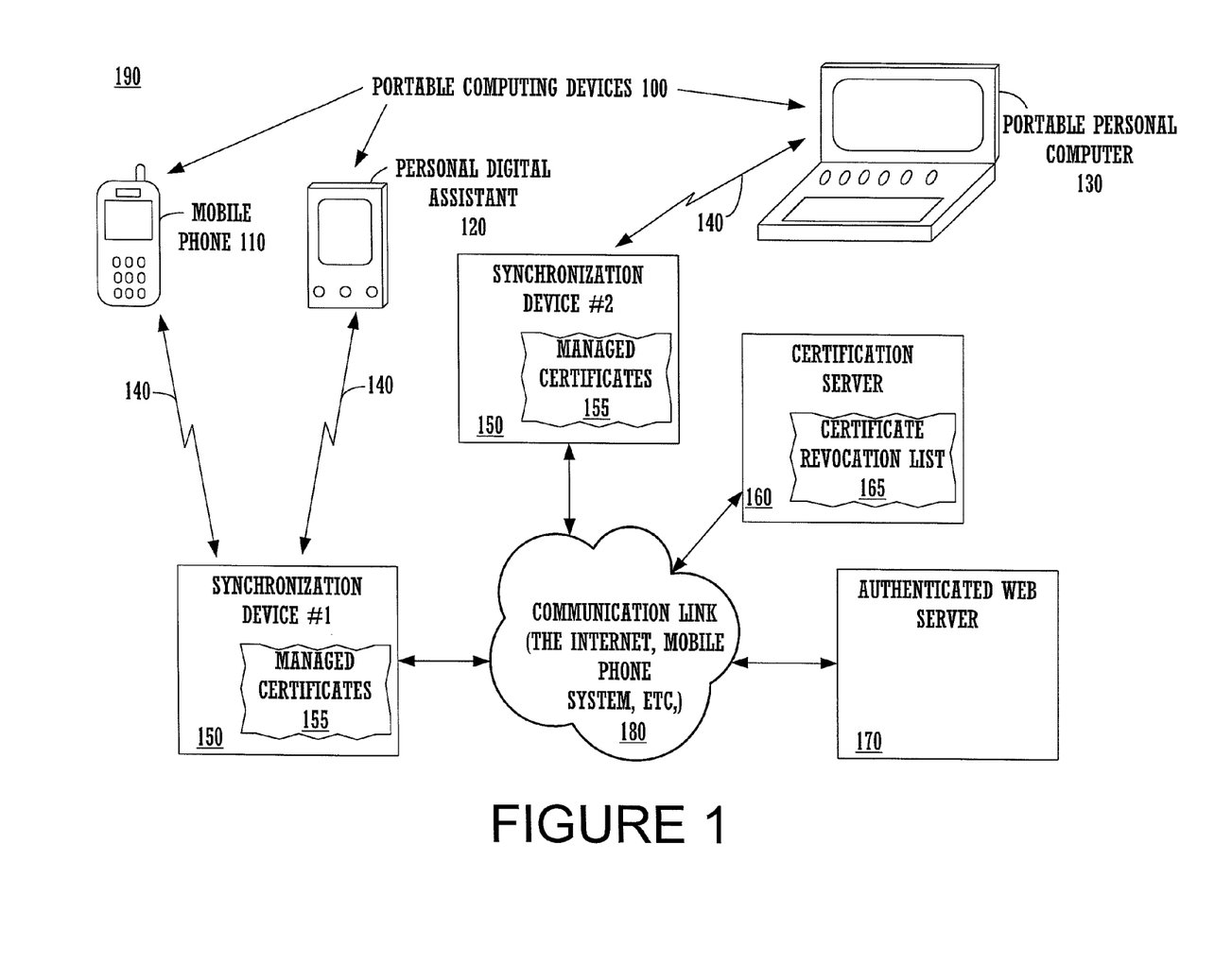
FIG. 1 shows three example portable computing devices and illustrates their interconnections, according to some embodiments of the invention, with two synchronization devices, a certification server and an authenticated web server.

FIG. 1 is a system or network diagram of for an example of a system, according to some embodiments of the invention, for checking revocation status of a digital certificate. Example system 190 includes three example portable computing devices 100, i.e. mobile phone 110, personal digital assistant 120 and pocket personal computer 130. Example system 190 also includes two synchronization devices 150, certification server 160 and web server 170 which is to be authenticated by means of its digital certificate.

Two synchronization links 140 couple mobile phone 110 and personal digital assistant 120 to synchronization device #1. Another synchronization link 140 couples portable personal computer 130 to synchronization device #2. Communications link 180 couples synchronization devices 150, certification server 160 and authenticated web server 170 with each other. In some embodiments of the invention, one or more of portable computing devices 100 may also be coupled to communications link 180.

Synchronization device 150 may be any device that can communicate with portable computing device 100 and that can perform a revocation check on a digital certificate. Example synchronization devices include but are not limited to: a personal computer, a desktop personal computer, a local server, a remote server or a server that is part of a mobile communication network.

In some embodiments of the invention, synchronization device 150 manages and maintains one or more managed certificates 155 along with the summaries of those certificates. Such management may include, but is not limited to: adding a certificate to the set being managed, generating a summary for a certificate, invalidating a certificate, removing a certificate from the set being managed, checking the revocation status of a certificate, automatically checking the revocation status of the certificates on a periodic basis, updating the summary of a certificate when it is found to have been updated, sending a summary of a certificate to the portable computing device, selecting which of the certificates have summaries sent to the portable computing device, or managing certificates for a plurality of portable computing devices.

Various embodiments of the invention may support various user interfaces for these management functions, including but not limited to: supporting direct user interaction with synchronization device 150, synchronization device 150 acting as a server to perform maintenance functions according to requests received from portable computing device 100; and separating user level management functions (such as adding and deleting which digital certificates are summarized on a particular portable computing device) from system administrator level management functions (such as adding and deleting which certificate authorities are trusted without further checking).

In some embodiments of the invention, communications between synchronization device 150 and its associated portable computing device 100 occur only during occasional synchronization operations. A synchronization operation may include other operations including but not limited to: backing up data from portable computing device 100, or reconciling changes made to data on synchronization device 150 with chances made to the same data on portable device 100. In other embodiments of the invention, synchronization device 150 and its associated portable computing device 100 communicate on an on going basis, or whenever the portable computing device is within a particular area within which synchronization link 140 is able to operate.

Synchronization link 140 may be any mechanism that provides communications coupling, at least on an intermittent basis, between portable computing device 100 and synchronization device 150. Examples of synchronization link 140 include but are not limited to: a cradle that holds portable computing device 100 and that is coupled to synchronization device 150, a wireless communications link, a local area network, a wide area network, a modem, a modem accessing the public switched telephone network, a link to a private intranet and an link to the Internet.

Certification server 160 may be any device that maintains at least one certificate revocation list 165. In some embodiments of the invention, the certification server may be operated by the issuer of the digital certificate. VeriSign Inc. of Mountain View, Calif. and Baltimore Technologies plc of Redding, England are two examples of certification authorities that maintain certificate revocation lists.

In other embodiments, the certification server may mirror a site operated by the issuer of the digital certificate, or hold a copy of the information contained in one or more certificate revocation lists 165. Certificate revocation lists from different certificate authorities may be combined into one master list. Alternatively, a single certificate authority may maintain multiple certificate revocation lists 165, e.g. one for each of the types of certificates they issue.

Communication link 180 may be any mechanism, or interconnected series of possibly heterogeneous mechanisms, that provide communications coupling between synchronization devices 150 and certification server 160. In some embodiments of the invention, communication link 180 also provides communications coupling to other devices, including but not limited to authenticated web server 170 or one or more of portable computing device 100. Examples of communication link 180 include but are not limited to one or more of: a wide area network, a modem, a modem accessing the public switched telephone network or the Internet.

It will be clear to one skilled in the art that example system 190 is not all inclusive, and can be modified or augmented by adding, deleting or modifying various portable computing devices, various interconnection mechanisms, various synchronization devices, various certification servers, various other devices, various other coupling mechanisms or any combination thereof.

Figure 2:
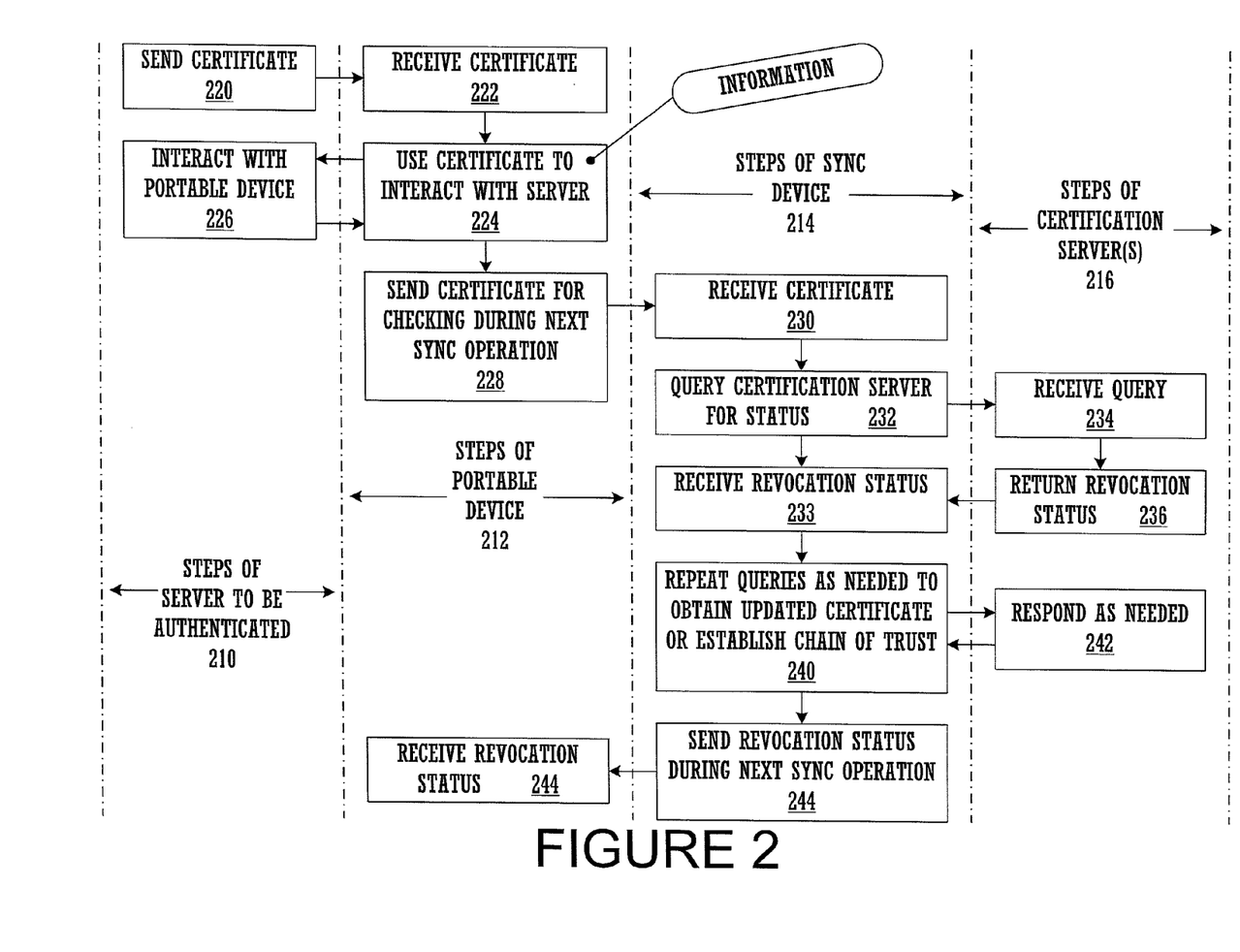
FIG. 2 illustrates the sequence of steps performed, according to other embodiments of the invention, when a portable computing device initiates use of a digital certificate.

FIG. 2 is a flowchart of process 200. Process 200 occurs in some embodiments of the invention when portable computing device 100 initiates use of a digital certificate. In FIG. 2, the operations of process 200 are divided into the steps in column 210 performed by a server to be authenticated, the steps in column 212 performed by a portable computing device, the steps in column 214 performed by a synchronization device and the steps in column 216 performed by a certification server. The horizontal lines linking the steps of process 200 represent both control flow and the information communicated among the devices via synchronization link 140 or communication link 180.

Process 200 starts with step 220, in which server to be authenticated 170 sends its digital certificate to portable computing device 100. In step 222, portable computing device 100 receives the digital certificate.

In some embodiments of the invention, portable computing device 100 next performs steps 224 and 226, in which it uses the information within the digital certificate to interact with server to be authenticated 170. While this incurs some risk of dealing with an unauthenticated server, this risk is mitigated by the fact that the digital certificate of the server will be checked soon.

In various embodiments of the invention, portable computing device 100 may use the digital certificate for operations including but not limited to: authenticating a business for electronic commerce, authenticating a web site, authenticating a consumer for electronic commerce, or authenticating an e-mail address.

In other embodiments, any transmission of private information to web server 170 or reliance on information obtained from web server 170 is postponed until after the revocation check is performed by synchronization device 150. In yet other embodiments, prior to using the digital certificate in steps 224 and 226, portable computing device 100 may inform the user that a revocation check has not yet been performed on the digital certificate, obtain the user's authorization to continue or suggest that for the time being the user limit what confidential information they send to the server, or what they do with information obtained the server.

In some embodiments of the invention, portable computing device 100 performs validity checks on the digital certificate prior to steps 224 and 226, in which the digital certificate is used. Such checks may include but art not limited to checking the signature of the certificate authority within the digital certificate. If the signature does not match the certificate, then these embodiments may inform the user, the user's system administrator, or both that the certificate appears to have been altered.

Step 228 occurs during a synchronization operation after steps 224 and 226. Typically, this is the synchronization operation between portable computing device 100 and synchronization server 150. In step 228, portable computing device 100 sends the digital certificate to synchronization device 150, which receives the certificate in step 230.

Next in step 232, synchronization device 150 sends a query to certification server 160, which is received in step 234. The revocation status of the digital certificate is queried. In some embodiments of the invention, a standard protocol, such as the Lightweight Directory Access Protocol (LDAP), is used for querying certification revocation list 165 on certification server 160.

Next in steps 236 and 238, the query is received and processed by certification server 160 and the results sent to and received by synchronization device 150. In some embodiments of the invention, the revocation status of the digital certificate may be but is not limited to: valid, updated, expired or revoked.

There are a number of reasons for which a digital certificate may be invalidated or revoked after it is issued. An important one is that the private key of the owner of the certificate may become compromised, that is, the private key may become known to one or more individuals who are not trusted. With the private key of Internet Book Sales, for example, a malicious person who obtains encrypted information being sent to Internet Book Sales can quickly and easily decrypt such information. Thus, the credit card number used to pay for an order, for example, could fall into the hands of whoever has taken the private key.

Another reason to invalidate a digital certificate is that the private key of the certificate authority has been compromised. A malicious person with that private key could issue an unlimited number of digital certificates that appear to be validly signed and that contain whatever false information that person desires to certify. Of course, professionally run organizations take precautions to protect their private keys from entering untrustworthy hands. Nevertheless, compromised keys have occurred and will continue to occasionally happen.

Such an update is not itself a malicious, but at best it is inconvenient for a user having the old address and at worst such an update can open the door for mischief. For example, a hacker or cyber thief might take over the old web address of Internet Book Sales and give out the old digital certificate. Such a web site would appear authenticated by that digital certificate, which would appear to be valid unless the user checks with the issuer of the certificate.

Next in steps 240 and 242, a query and response process similar to that of steps 232 to 238 is repeated as needed. This process may occur between synchronization server 150 and the same certification server 160 previously accessed, or other certification servers 160 may need to be accessed to establish a chain of trust. Additional queries may also be needed to obtain a valid digital certificate if the status of the initial certificate is "updated". Additional queries may also be needed if the certificate is valid but is issued by a certification authority that is unknown to or un-trusted by portable computing device 100. In some cases (e.g. a valid status is returned by a trusted certification server), then steps 240 and 242 are unnecessary and are skipped.

Next in step 244 synchronization device 150 sends to portable computing device 100 the certificate revocation status, which is received in step 246. If the status is other than valid, then some embodiments of the invention notify the user of portable computing device, preclude any further dealings with web server 170 or both.

Figure 3:
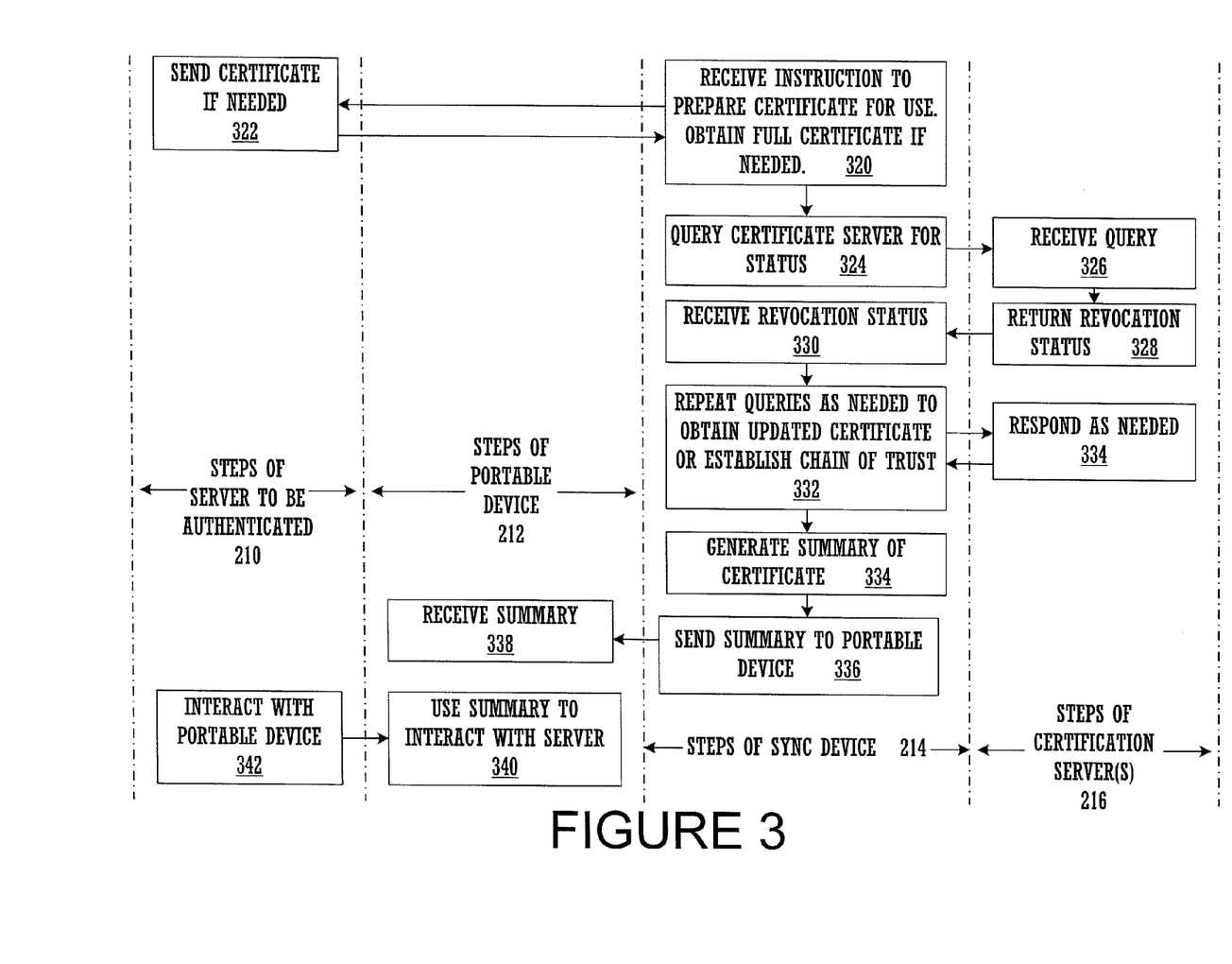
FIG. 3 shows the sequence of steps performed, according to yet other embodiments of the invention, when a synchronization server checks the revocation status and generates a summary of a digital certificate in anticipation of its use by a portable computing device.

FIG. 3 is a flowchart of process 300. Process 300 occurs in some embodiments of the invention when synchronization server 150 initiates checking and summarizing a digital certificate in anticipation of its use by portable computing device 100. In FIG. 3, the operations of process 300 are divided into the steps in column 210 performed by a server to be authenticated, the steps in column 212 performed by a portable computing device, the steps in column 214 performed by a synchronization device and the steps in column 216 performed by a certification server. The horizontal lines linking the steps of process 300 represent both control flow and the information communicated among the devices via synchronization link 140 or communication link 180.

Process 300 starts with step 320, in which synchronization device 150 receives instructions to prepare a particular digital certificate for use by one or more portable computing devices 100. In various embodiments of the invention, this instruction may come from a source including but not limited to: a user of synchronization device 150 (such as a system administrator) performing certificate maintenance, or a user of portable computing device 100. If the request received in step 320 does not include a full copy of the digital certificate, then step 320 includes accessing web server 170 or certification server 180 to obtain the full certificate. In step 322, one of those devices, web server 170 for example, sends the digital certificate to synchronization device 150.

Next in step 324, synchronization device 150 sends a revocation status query to certification server 160, which is received in step 326. Next in steps 328 and 330, the query is received and processed by certification server 160 and the results sent to and received by synchronization device 150.

Many embodiments of the invention perform other validity checks on the digital certificate, as part of step either step 324 or step 330. For example, synchronization device 150 may check the signature of the certificate authority within the digital certificate. If the signature does not match the certificate, then these embodiments may stop further processing of the certificate, inform whoever requested the certificate that it appears to have been altered, or both.

Next in steps 332 and 334, a query and response process similar to that of steps 324 to 330 is repeated as needed. This process may occur between synchronization server 150 and the same certification server 160 previously accessed, or other certification servers 160 may need to be accessed to establish a chain of trust. Additional queries may also be needed to obtain a valid digital certificate if the status of the initial certificate is "updated". Additional queries may also be needed if the certificate is valid but is issued by a certification authority that is unknown to or un-trusted by portable computing device 100. In some cases (e.g. a valid status is returned by a trusted certification server), then steps 332 and 334 are unnecessary and are skipped.

Next in step 334, synchronization device 150 may generate a summary of the digital certificate. Summaries of digital certificates are discussed below. Alternatively, a full copy of the digital certificate may be sent to portable computing device 100 as the "summary" of the certificate.

Next in step 336 synchronization device 150 sends to portable computing device 100 the certificate summary, which is received in step 338.

Portable computing device 100 may then go on to perform steps 340 and 342, in which it uses the information within the certificate summary to interact with authenticated server 170. Typically but not necessarily, this interaction with the server is under the control of the user of portable device 150; thus, it happens when and if the user initiates it.

Figure 4:
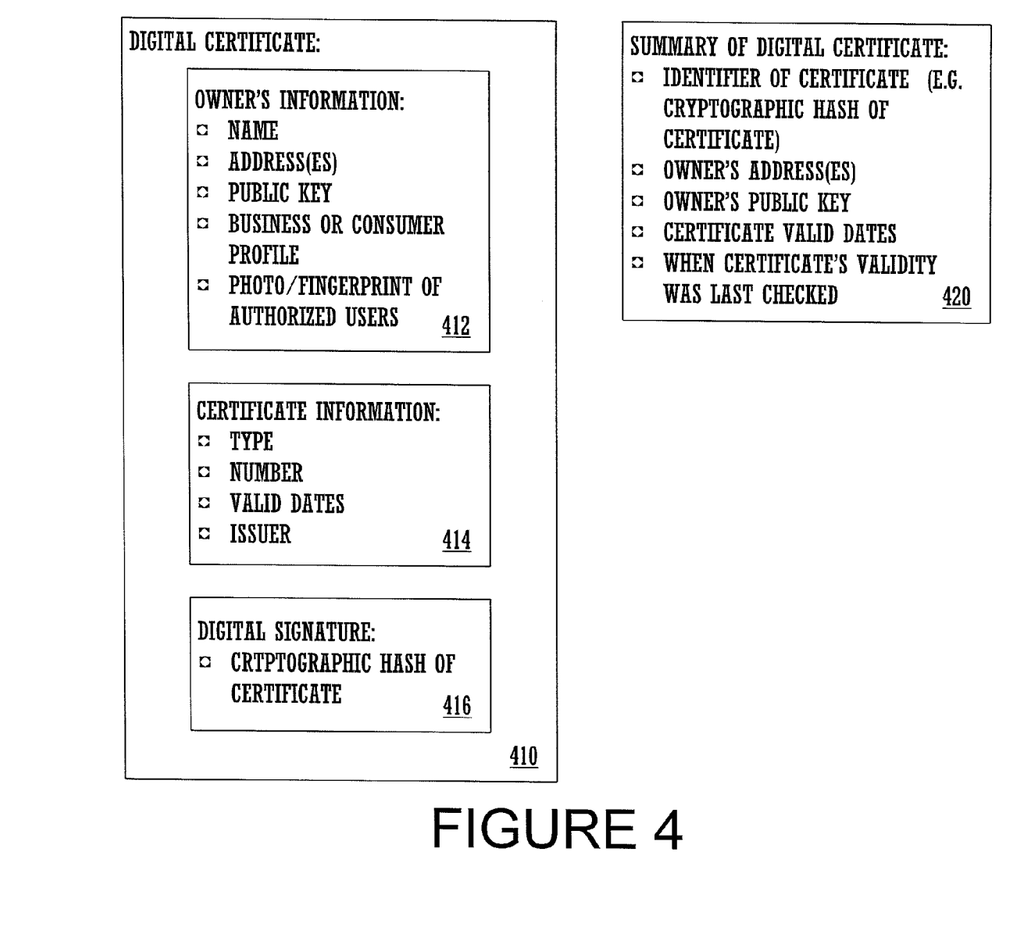
FIG. 4 illustrates the contents of an example digital certificate including its the digital signature, and of an example summary of a digital certificate according to some embodiments of the invention.

FIG. 4 illustrates the contents of an example digital certificate 410. For the purposes of this invention, digital certificate 410 may be any electronic document the authenticity, validity or status of which can be checked by accessing information maintained by a third party. FIG. 4 also illustrates the contents of an example summary of digital certificate 420 according to some embodiments of the invention. Some embodiments of the invention use digital certificates that comply with the well known X.500 protocols and standards. One reference is the X.509 standard.

The information contained in a digital certificate may be considered to be divided into three parts: information about the owner 412, information about the certificate 414 and digital signature 416.

Owner's information 412 may include, but is not limited to, one or more of the following: the name of the owner, one or more addresses of the owner, the public key of the owner, a business or consumer profile of the owner, or identification information of authorized users or agents of the owner (such as a digital photograph or a fingerprint). Addresses of the owner may include, but are not limited to, one or more of the following: a physical address, an e-mail address, a universal resource locator (URL) for a web site or an internet protocol (IP) address of a server.

Generally a person or entity seeking a digital certificate supplies owner's information 412 to the certificate authority. The certificate authority then verifies some or all of this information prior to issuing the digital certificate.

Some certificate authorities issue certificates of different types depending on what types of information about the owner is contained in the certificate and on the degree to which the information has been checked by the certificate authority. For example, the information in some digital certificates has been verified to meet accepted standards for electronic transfers of potentially large amounts of money. Other digital certificates certify only that a particular e-mail address is owned by the certificate owner, who may be otherwise anonymous.

Some certificate authorities generate and assign public and private key pairs, put the public key in the certificate they issue and securely convey the private key to the certificate owner.

Certificate information 414 may include, but is not limited to, one or more of the following: the type of the certificate, the number of the certificate, a date before which the certificate is not valid, a date after which the certificate is not valid, and information about who the issuer is and how they can be reached.

A digital signature is generally be considered to contain both information about the signer and information calculated based on the content of the document, message or file that is being signed. The calculations are made according to an accepted cryptographic technique that can be checked when the document and its signature are read. The techniques used give the reader of a digitally signed document a very high degree of assurance that: i) the signature was actually made by the person or entity whose signature appears in the document; and ii) the signed document has not been altered after it was signed.

Digital signature 416 may be based on a cryptographic hash of some or all of the information contained within owner's information 412 and certificate information 414. The issuer of the digital certificate specifies the type of hash that is used. Examples of suitable cryptographic hashes include but are not limited to: (1) MD5, which is described in the Internet Engineering Task Force (ITEF) Request for Comments (RFC) Number 1321 which may be available via www.ietf.org; (2) Standard Secure Hash Algorithm-1 (SHA-1) as specified by the Federal Information Processing Standards (FIPS) in PUB 180-1, which may be available via www.itl.nist.gov/fipspubs/index.htm; or (3) Future versions or revisions of these standards, such as SHA-256 or SHA 512.

Knowing the exact hash used, the user of a digital certificate can regenerate the hash value from the information within the certificate. If the re-computed hash value matches the one contained in the certificate, then it is very unlikely that any of the information upon which the hash is based was altered after the certificate was signed.

Some or all of the information within digital certificate 410 may be encrypted using the private key of the certificate authority (signed). If that information can be successfully decrypted using the public key of the certificate authority (verified), then it is very unlikely that anyone other than the certificate authority issued the certificate.

A typical digital certificate may be 4K bytes long. The user of a portable computing device may desire to interact with an unlimited number of servers, persons or entities, each of whom can have their own certificate. Much of the information in a digital certificate is relevant to verifying the certificate rather than using the certificate for secure communications. Thus, it may be advantageous for a portable computing device to only retain a summary of each certificate that is uses, such as example summary of digital certificate 420.

Summary of digital certificate 420 includes but is not limited to the following: an identifier with which both portable computing device 100 and synchronization device 150 can refer to the certificate and its summary, one or more verified addresses for the owner of the certificate, the public key of the owner to secure communications to the owner, and validity information about the certificate. Such validity information may include but is not limited to: a date before which the certificate is not valid, a date after which the certificate is not valid, or a date or date and time at which the latest revocation check was performed on the certificate.

Some embodiments of the invention use a cryptographic hash of some or all of the digital certificate as the identifier of that certificate using, for example, one of the hash functions mentioned above with respect to digital signature 416. Other embodiments use a number that is unique among a particular synchronization device 150 and the portable computing devices 100 that that synchronization device supports, perhaps a number that is randomly generated.

Figure 5:
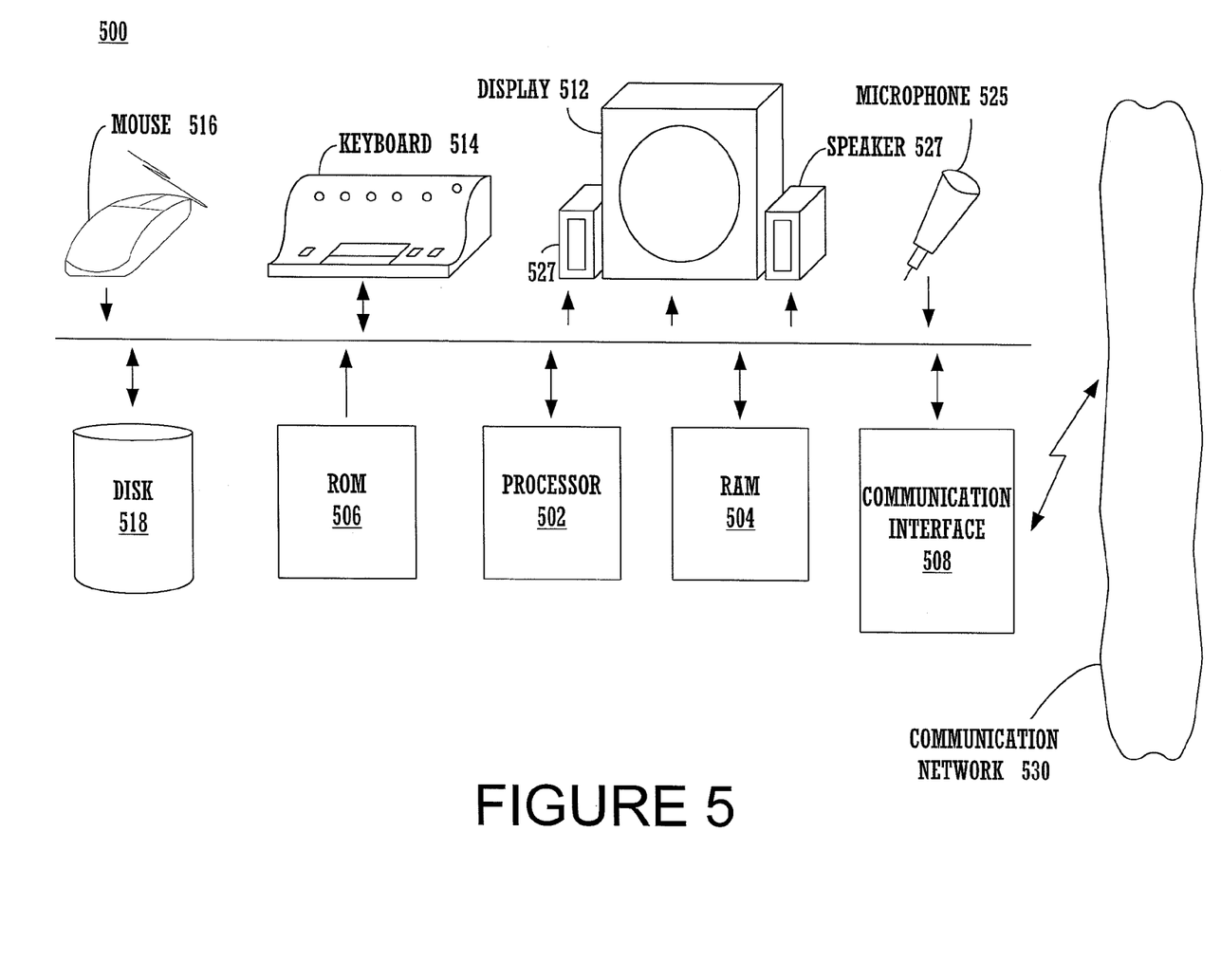
FIG. 5 shows the functional components and their interconnections for an example computer system that can be used in various embodiments of the invention.

FIG. 5 is a block diagram of an example computer system that can be used in some embodiments of the invention. Computer system 500 is not limited to being a typical personal computer but it may be any type of computing device, including but not limited to servers, portable computing devices, or personal digital assistants.

Computer system 500 and variants thereon may be employed in various embodiments of the invention including but not limited to being used as a portable computing device 100, a synchronization device 150, certification server 160, web server 170, or as parts of communication link 180.

Computer system 500 comprises one or more buses 510 configured to communicate information including addresses, op codes and data. The computer system also comprises one or more processors 502 configured to process information and data according to instructions and other data. The processor may be but is not limited to a central processing unit, a microprocessor, an embedded processor, or a special purpose processor.

Computer system 500 may optionally include RAM 504, that is, one or more volatile memory units or other devices or circuits configured to store information, data and instructions. RAM 504 may be but is not limited to random access memory (RAM), static RAM, or dynamic RAM. RAM 504 is coupled to bus 510.

Computer system 500 may optionally include ROM 506, that is, one or more non-volatile memory units or other devices or circuits configured to store static information and instructions. ROM 506 may include, but is not limited to: read only memory (ROM), programmable ROM, flash memory, electrically programmable ROM (EPROM), or erasable electrically programmable ROM (EEPROM). ROM 506 is coupled with bus 510.

Computer system 500 may optionally include communication interface 508, that is, one or more devices or circuits configured to interface with another electronic device via communication network 530. Communication network 530 may include but is not limited to one or more of the following: synchronization link 140, communication link 180, a wireless communication network, or a wired communication network or line. Communication interface 508 is coupled to bus 510.

Communication interface 508 may include, but is not limited to, one or more of the following: a serial communication port, a Universal Serial Bus (USB), an Ethernet adapter, an IEEE 1394 bus interface, a parallel port, a small computer system interface (SCSI) bus interface, an infrared (IR) communication port, a Bluetooth wireless communication adapter, a broadband connection, or a connection to the Internet.

Computer system 500 may optionally include keyboard 514, that is, one or more alphanumeric input devices configured to communicate information and command selections from a user. Keyboard 514 may, for example, have alphabetic, numeric, function and control keys, buttons, selectors or touch-sensitive screens. The keyboard is coupled to bus 510.

Computer system 500 may optionally include mouse 516, that is, one or more cursor control, indicating, selecting or pointing devices configured to communicate analog, quantitative or selection user input information and command selections to processor 502. Mouse 516 may include but is not limited to: a mouse, a track ball, a track pad, an optical tracking device, a joystick, a game controller, a touch screen, or a glove. The mouse is coupled to bus 510. Alternatively or additionally, the functions of mouse 516 may be activated via input from keyboard 514 using special keys, key sequences or commands.

Computer system 500 may optionally include one or more devices configured to sense, process, generate and recognize voice commands, responses or other words. Voice recognition may replace or augment the functions of keyboard 514, mouse 516, or both. Such devices may include, but are not limited to: microphone 525 or speaker 527, which may also be used for audio capture and reproduction of, for example, speech, singing and music.

Computer system 500 may optionally include disk 518, that is, one or more devices or circuits configured to store sizable amounts of information, data or instructions. Disk 518 may include, but is not limited to: a mass storage device, a magnetic disk, an optical disk, a compact disk (CD), a writeable CD, a digital versatile disk (DVD), a hard disk, a floppy disk, a flash memory or a memory stick. Disk 518 is coupled to bus 510.

Computer system 500 may optionally include display 512, that is, one or more devices or circuits configured to display pictures, video, text or graphics. Display 512 may include, but is not limited to: a cathode ray tube (CRT), a flat panel display, a liquid crystal display (LCD), a field emission display (FED), an organic light emitting diode (OLED) display, or a heads up display suitable for use in a vehicle. Display 512 is coupled to bus 510.

Certain operations, processes and steps are discussed herein that may be realized, in some embodiments of the invention, as a series of instructions, including but not limited to codes, commands, program operation codes (op codes), pseudo codes (p-codes), firmware or software. These instructions may be executed by various components of the system, including but not limited to: processor 502, programmable controllers within communications interface 508, or programmable controllers within disk 518.

Figure 6:
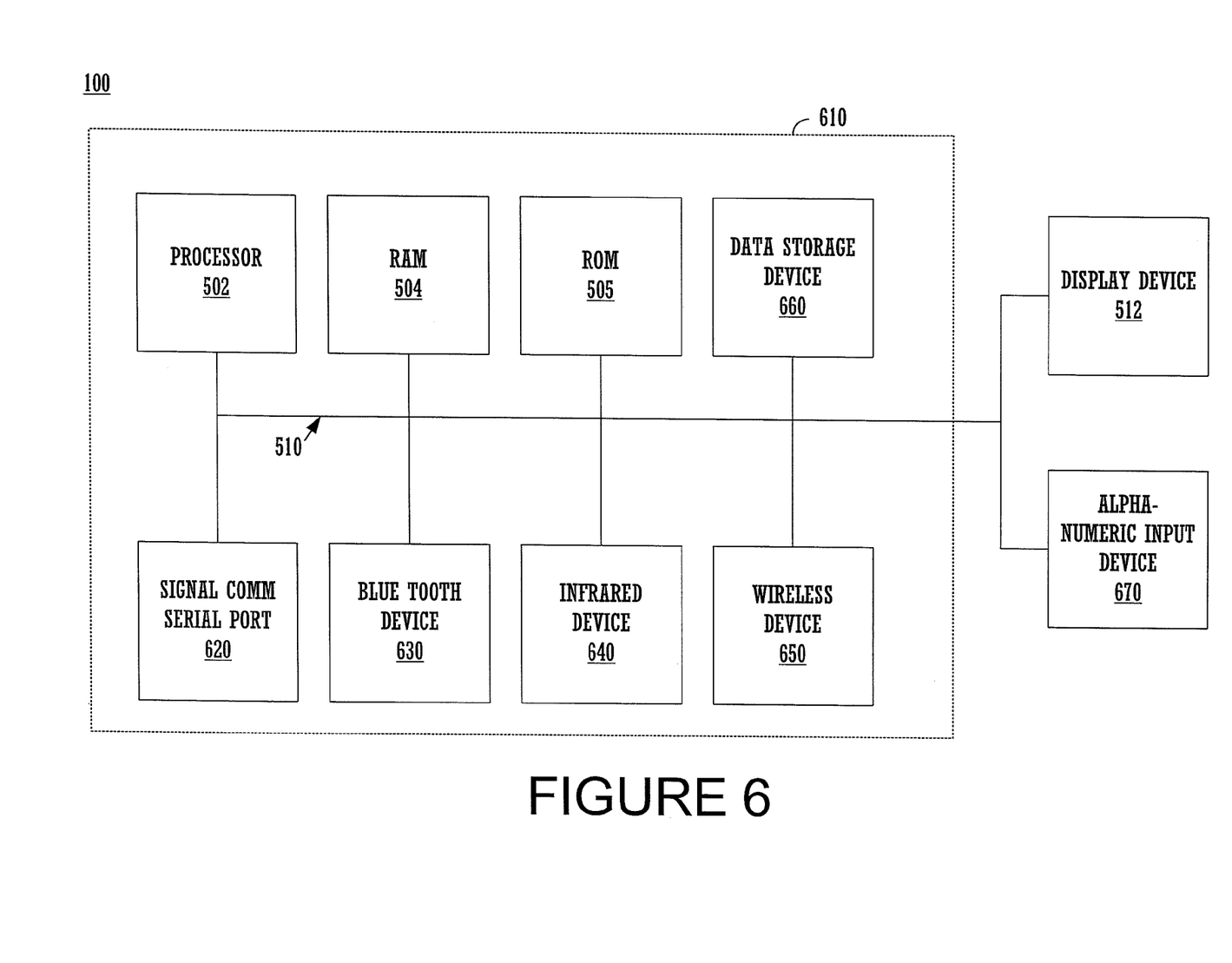
FIG. 6 shows the functional components and their interconnections for an example portable computing device that can be used in various embodiments of the invention.

FIG. 6 shows the functional components and their interconnections for an example of a portable computing device that can be used in various embodiments of the invention. FIG. 5 may represent some instances of portable computing device 100, while other instances may be better represented by FIG. 6. Several components of example portable computing device 600 may be housed on a circuit board 610, which may be contained within a cover assembly.

Several components of example portable computing device 600 have been discussed with respect to FIG. 5 above.

These include processor 502, RAM 504, ROM 506, bus 510 and display device 512. Signal communications serial port 620, blue tooth device 630, infrared device 640 and wireless device 650 are instances of communication interface 508, as discussed above.

In some embodiments of the invention, signal communications serial port 620 is designed to interface example portable computing device 600 with synchronization device 150 via a cradle into which device 600 can be placed. The cradle may be wired to a serial input port of synchronization device 150, which may be a desktop PC.

Example portable computing device 600 optionally includes data storage device 660. In some embodiments, data storage device 660 is a device, card or component that can be removed from example portable computing device 600. Data storage device 660 may include but is not limited to: a thin profile memory, a simple identity module (SIM), a wireless identity module (WIM), or a personal computer memory card international association (PCMCIA) card, also known as a PC card.

Example portable computing device 600 optionally includes alphanumeric input device 670. In some embodiments of the invention, display device 512 is a flat panel display having a touch screen overlaid on the display. In such embodiments, input device 670 includes the touch screen. Such a touch screen may include a plurality of pressure activated sensors that register the position on display device 512 where contact is made and an accelerometer that registers the pressure of that contact. Input device 670 may send the spatial and pressure data to processor 502 via bus 510. Input device 670 may also communicate command selections, such as button presses, to processor 502.

Certain operations, processes and steps are discussed herein that may be realized, in some embodiments of the invention, as a series of instructions, including but not limited to codes, commands, program operation codes (op codes), pseudo codes (p-codes), firmware or software. These instructions may be executed by various components of the system, including but not limited to: computer system 500, example portable computing device 600, processor 502, programmable controllers within communications interface 508, or programmable controllers within disk 518.

When executed by a programmable device, the instructions control the device so that it performs specific actions as described herein. Representations of these instructions may reside within, or be made available via, various media. Such media include but are not limited to: memory devices, floppy disks, compact disks (CDs), digital versatile disks (DVDs), computer readable media, or information streams such as those that may be made available via communications interface 508.

Accordingly, the invention as described herein provides a method and system for checking revocation of digital certificates used on portable computing devices.

The foregoing drawing figures and descriptions are not intended to be exhaustive or to limit the invention to the forms disclosed. Rather, they are presented for purposes of illustrating, teaching and aiding in the comprehension of the invention. The invention may be practiced without the specific details described herein. Numerous selections among alternatives, changes in form, and improvements can be made without departing from the principles, spirit or essence of the invention. The invention can be modified or varied in light of the teachings herein, the techniques known to those skilled in the art, and advances in the art yet to be made.

The scope of the invention for which a patent is sought is set forth by the following claims and their legal equivalents.

I claim:

1. A process for authentication of digital certificates of a portable computing device with reference to a certificate server, said portable computing device being served for synchronization during occasional synchronization intervals by a synchronization device, the process comprising the steps of:
providing a source communication link between said certificate server and said synchronization device to maintain managed certificate data for said portable computing device in said synchronization device;
with the initial use of a specific digital certificate by said portable computing device, generating a record at said synchronization device and providing the record, including said specific digital certificate in a digital certificate summary to said portable computing device, wherein said record identifies the portable computing device and is unique among said portable computing device, said synchronization device, and any other portable computing devices said synchronization device supports;
during said occasional synchronizing intervals of said portable computing device, checking said digital certificate summary in said portable computing device through a communication link, with reference to said managed certificate data in said synchronization device; and
communicating status data from said synchronization device to said portable computing device through a communication link to authenticate said certificate summary in said portable computing device as for subsequent use of said specific digital certificate.

2. A process according to claim 1, wherein said portable computing device comprises a personal digital assistant.

3. A process according to claim 1, wherein said portable computing device comprises a mobile phone.

4. A process according to claim 1, wherein said portable computing device comprises an electronic mail device.

5. A process according to claim 1, wherein said portable computing device comprises a portable personal computer.

6. A process according to claim 1, wherein said managed certificate date includes one or more managed certificates along with summaries of those certificates.

7. A process according to claim 1, wherein said source communication link comprises at least one of the following group of networks:
the internet;
a mobile phone system;
a wide area network; and
a modem accessing a public switched telephone network.

8. A process according to claim 1, wherein said communication link includes a cradle for said portable computing device.

9. A process according to claim 1, wherein said managed certificate data includes a set of digital certificates.

10. A process according to claim 1, wherein said status data comprises at least one of the following group of status:
valid;
updated;
expired;
revoked; and
revoked check not performed.

11. A system for authentication of digital certificates of a portable computing device having one or more stored certificates with reference to a certificate server comprising:
a synchronizing device configured to synchronize said portable computing device during occasional synchronization operations and adapted to be linked to said certificate server to maintain certificate data for said portable computing device; and a communication link active during said occasional synchronizing operations for checking any stored certificates in said portable computing device with reference to said certificate data in said synchronization device to authenticate said stored certificates in said portable computing device;

wherein said synchronizing device is adapted to generate a summary of a digital certificate and to deliver said summary to said portable computing device wherein said summary identifies the portable computing device and is unique among said portable computing device, said synchronizing device, and any other portable computing devices said synchronizing device supports, and wherein said synchronizing device communicates status data to said portable computing device through the communication link to authenticate said summary in said portable computing device as for subsequent use of the certificate data.

12. A system according to claim 11, wherein said portable computing device comprises a personal digital assistant.

13. A system according to claim 11, wherein to maintain managed certificate data for said portable computing device, includes at least one of the following group of management activities:

adding a certificate;

generating a summary for a certificate invalidating a certificate checking a revocation status of a certificate;

selecting a certificate data to be set to said portable computing device; updating said summary of a certificate.

14. A system according to claim 11, wherein said status data comprises at least one of the following group of status:

valid;

updated;

expired;

revoked; and revoked check not performed.

15. A method, performed at a device used to synchronize a computing device, of facilitating interaction between said computing device and a first server that is authenticated using a digital certificate, the method comprising the steps of:

receiving a request to prepare said digital certificate for use by said computing device;

querying a certificate server for a revocation status of said digital certificate;

generating a summary of said digital certificate upon receiving a response from said certificate server; and sending said summary of said digital certificate to said computing device;

wherein said summary of the digital certificate is used by said computing device during communication with said first server, and wherein said summary of said digital certificate identifies the portable computing device and is unique among said computing device, said device used to synchronize said computing device, and any other portable computing devices said device used to synchronize said computing device supports.

* * * * *